United States Patent
Furuya et al.

(10) Patent No.: US 11,743,396 B2
(45) Date of Patent: Aug. 29, 2023

(54) ELECTRONIC ALBUM GENERATING APPARATUS, ELECTRONIC ALBUM GENERATING METHOD, AND NON-TRANSITORY COMPUTER-READABLE STORAGE MEDIUM

(71) Applicant: Canon Kabushiki Kaisha, Tokyo (JP)

(72) Inventors: Misato Furuya, Kanagawa (JP); Kazumasa Matsushita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 17/119,191

(22) Filed: Dec. 11, 2020

(65) Prior Publication Data

US 2021/0185182 A1 Jun. 17, 2021

(30) Foreign Application Priority Data

Dec. 12, 2019 (JP) .................................. 2019-224829

(51) Int. Cl.
*H04N 1/00* (2006.01)
*G06N 20/00* (2019.01)
*G06N 3/08* (2023.01)
*G06N 3/045* (2023.01)

(52) U.S. Cl.
CPC ......... *H04N 1/00196* (2013.01); *G06N 3/045* (2023.01); *G06N 3/08* (2013.01); *G06N 20/00* (2019.01)

(58) Field of Classification Search
CPC .... H04N 1/00196; G06N 3/0454; G06N 3/08; G06N 20/00; G06N 3/04
See application file for complete search history.

(56) References Cited

U.S. PATENT DOCUMENTS

| | | | |
|---|---|---|---|
| 10,452,920 B2 * | 10/2019 | Kauffmann | G11B 27/031 |
| 2017/0351972 A1 * | 12/2017 | Kaniwa | G06F 30/20 |
| 2019/0318003 A1 * | 10/2019 | Kennedy | G06F 16/55 |

FOREIGN PATENT DOCUMENTS

JP 2010237986 A 10/2010

\* cited by examiner

*Primary Examiner* — Yogesh K Aggarwal
(74) *Attorney, Agent, or Firm* — Venable LLP

(57) ABSTRACT

An electronic album generating apparatus includes an accepting unit configured to accept order information of an electronic album from a user, a specifying unit configured to specify a theme of the electronic album; a selecting unit configured to select, from a plurality of learned models generated by machine learning based on a past order of the user from whom the order information was accepted, a learned model to be used to generate the electronic album a generating unit configured to generate an electronic album based on the order information and the learned model selected by the selecting unit. In a case in which the learned model generated by machine learning based on the past order of the user has not learned the theme specified by the specifying unit, the selecting unit selects another learned model which has learned the theme.

8 Claims, 5 Drawing Sheets

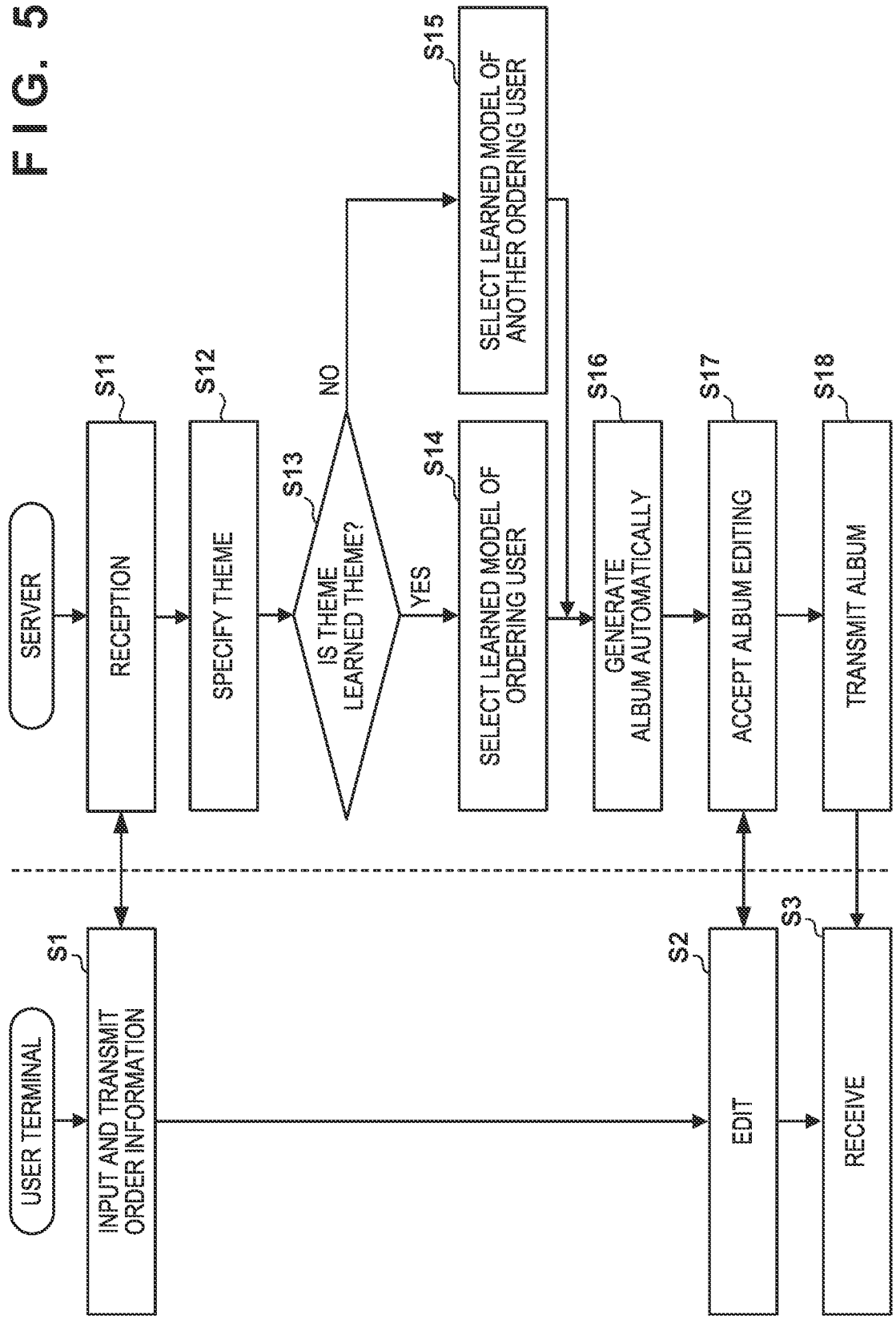

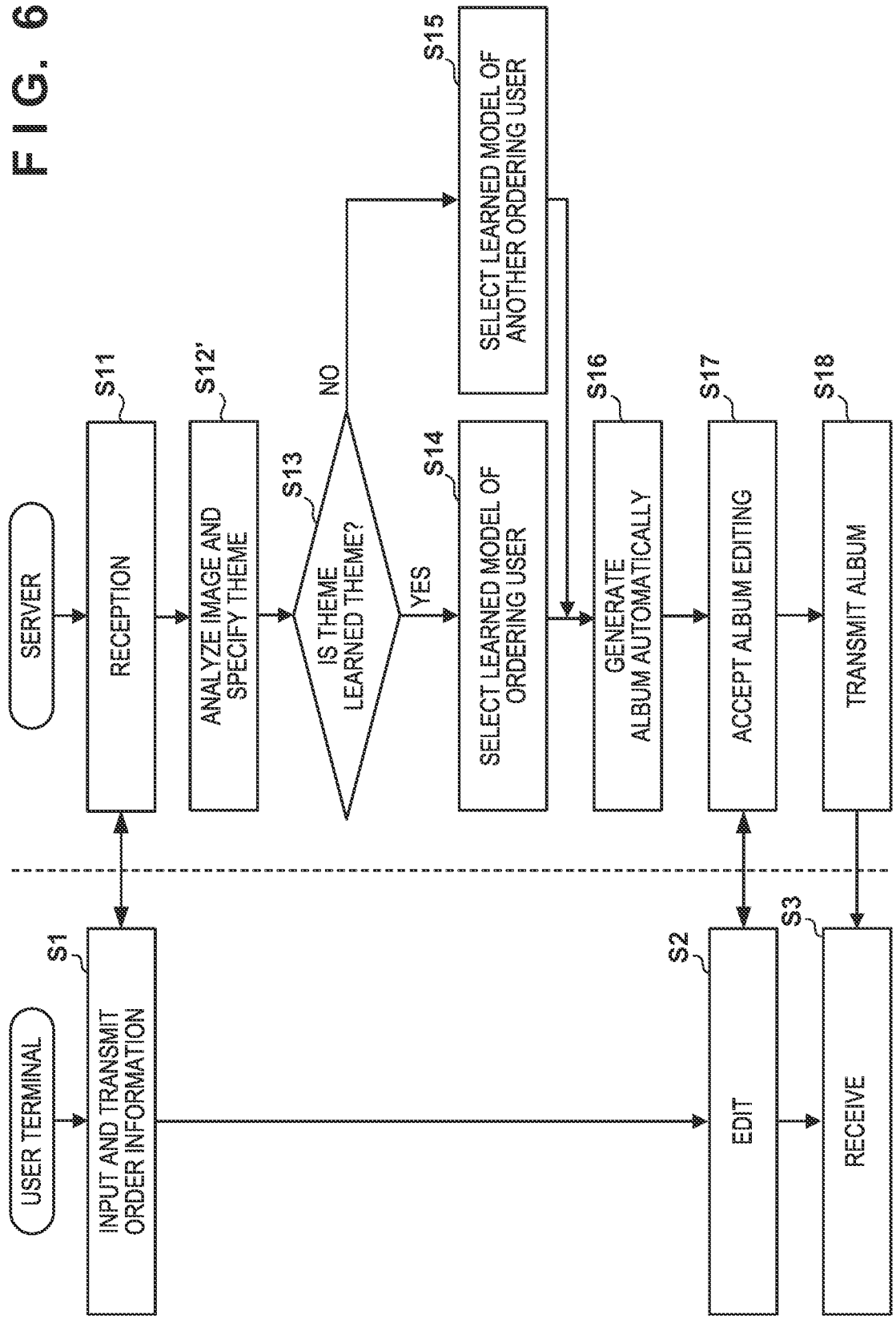

ELECTRONIC ALBUM GENERATING APPARATUS, ELECTRONIC ALBUM GENERATING METHOD, AND NON-TRANSITORY COMPUTER-READABLE STORAGE MEDIUM

BACKGROUND OF THE INVENTION

Field of the Invention

The present invention relates to a technique for generating an electronic album.

Description of the Related Art

There is proposed a technique for generating an electronic album which reflects the preference of a user when an electronic album is to be generated (Japanese Patent Laid-Open No. 2010-237986). According to such a technique, an electronic album that reflects the preference of the user can be provided efficiently.

As a method of reflecting the preference of a user to an electronic album, a method that generates a learned model based on the user's past order by machine learning and uses the learned model to generate an electronic album of a new order can be considered.

On the other hand, the layout and the images suitable for an electronic album may greatly change depending on the theme. Hence, if a learned model is used to generate an electronic album when a user has ordered an electronic album which has a theme different from the theme of the user's past order, an electronic album that greatly differs from the intention of the user may be provided.

SUMMARY OF THE INVENTION

The present invention provides a technique for generating an electronic album that is in accordance with a theme while reflecting the preference of a user.

According to an aspect of the present invention, there is provided an electronic album generating apparatus comprising: an accepting unit configured to accept order information of an electronic album from a user; a specifying unit configured to specify, based on the order information, a theme of the electronic album; a selecting unit configured to select, from a plurality of learned models generated by machine learning based on a past order of the user from whom the order information was accepted, a learned model to be used to generate the electronic album; and a generating unit configured to generate an electronic album based on the order information and the learned model selected by the selecting unit, wherein in a case in which the learned model generated by machine learning based on the past order of the user has not learned the theme specified by the specifying unit, the selecting unit selects another learned model which has learned the theme.

Further features of the present invention will become apparent from the following description of exemplary embodiments (with reference to the attached drawings).

BRIEF DESCRIPTION OF THE DRAWINGS

FIG. 5 is a flowchart showing an electronic album ordering procedure; and

FIG. 6 is a flowchart showing another electronic album ordering procedure.

DESCRIPTION OF THE EMBODIMENTS

Figure 1:
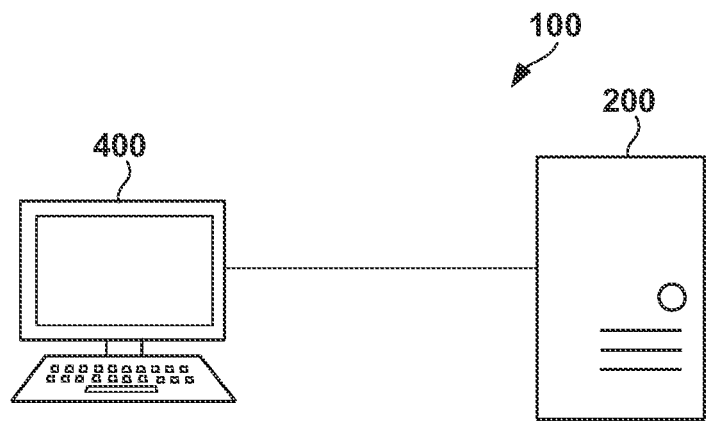
FIG. 1 is a view showing the arrangement of an electronic album generating system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

<System Arrangement>

FIG. 1 is a view showing the arrangement of an electronic album generating system 100. This system 100 includes a device 400, which is a user terminal, and a cloud server 200, which functions as an electronic album generating apparatus and can be connected to a network. Various kinds of apparatuses, for example, a smartphone, a personal computer, and the like, which can communicate with the server 200 can be included as the device 400. Although only one device 400 is illustrated in FIG. 1, many users can access the cloud server 200 by using the device 400. The cloud server 200 executes a service that provides a user with an electronic album by automatically generating the electronic album in response to an order issued from the user via the device 400.

Figure 2:
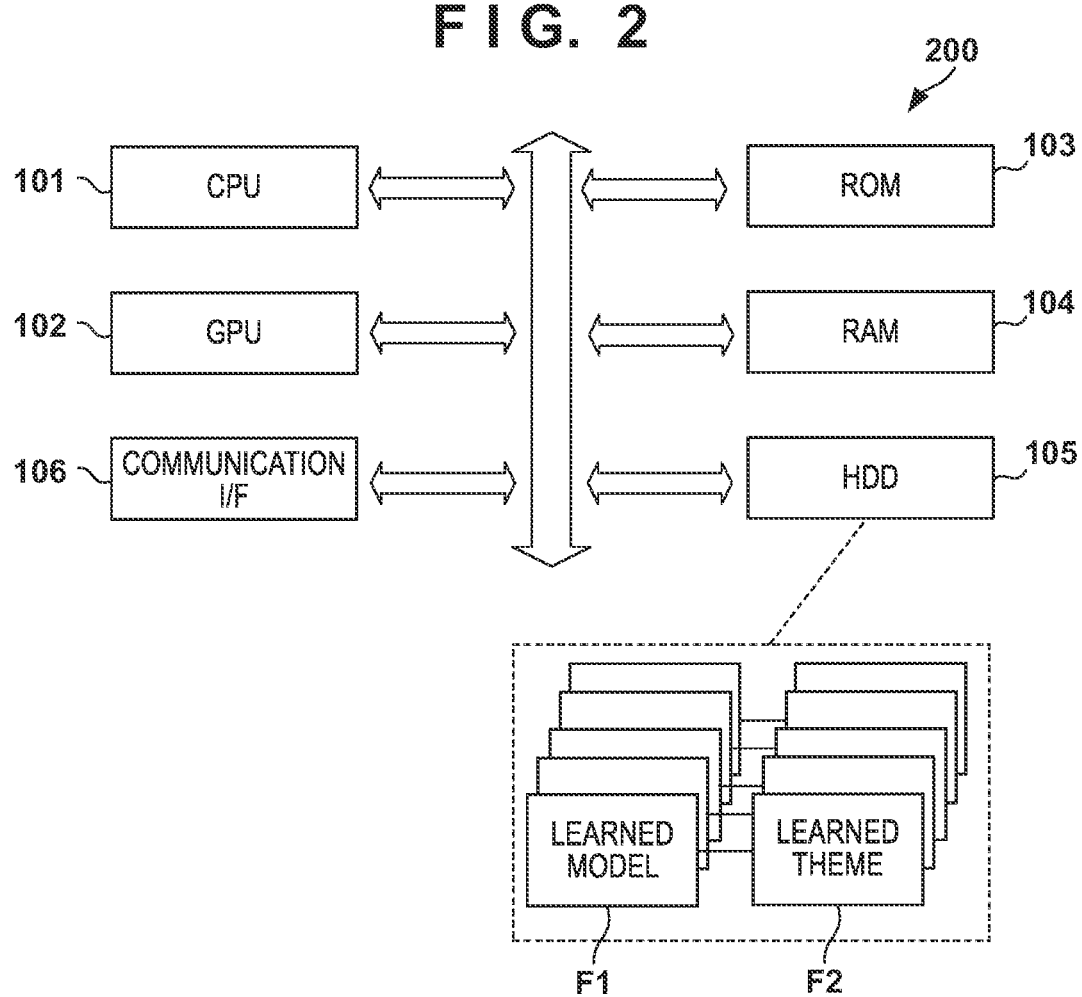
FIG. 2 is a block diagram showing the arrangement of a server.

FIG. 2 is a block diagram showing the hardware arrangement of the cloud server 200. A CPU 101 integrally controls the operation of the cloud server 200 by loading control programs stored in a ROM 103 to a RAM 104 and reading out the loaded control programs as needed to perform various kinds of control operations.

A GPU 102 is a processor that can execute various kinds of arithmetic processing operations instead of the CPU 101. The GPU 102 can efficiently perform arithmetic operations by preforming as many data parallel processing operations as possible. In a case in which machine learning, such as deep learning, is to be performed over a plurality of times by using a learning model, it is efficient to perform processing by the GPU 102. In this embodiment, the GPU 102 will be used in addition to the CPU 101 in the processing by a learning unit 251 (to be described later). More specifically, in a case in which a learning program including a learning model is to be executed, learning is executed by causing the CPU 101 and the GPU 102 to perform arithmetic processing in cooperation. Note that the arithmetic processing of the learning unit 251 may be performed by only the CPU 101 or the GPU 102. In addition, an inference unit 254 may also use the GPU 102 in a manner similar to the learning unit 251.

The ROM 103 stores various kinds of programs. This embodiment assumes that a flash storage or the like is used as the ROM 103. The RAM 104 is the main storage device of the CPU 101 and is used as a work area and a temporary storage area for deploying various kinds of programs stored in the ROM 103. A hard disk drive (HDD) 105 is a large-capacity storage device. Note that although the ROM 103, the RAM 104, and the HDD 105 are exemplified as storage devices in this embodiment, other storage devices can be adopted as well.

Application programs such as an album creation application and the like and image data and the like are stored in the HDD 105. The HDD 105 also stores the data of a plurality of types of learned models F1. The plurality of types of learned models F1 includes a learned model F1 for each user who uses the service. The learned model F1 for each user is generated by machine learning based on the user's past order. The learned model F1 for each user is associated with theme information F2. The theme information indicates the learned theme of the learned model F1. A theme is an album theme of an electronic album. An album theme is, representatively, a matter related to an object of an image to be put in the album. More specifically, for example, matters such as travel, children, pets, weddings, and the like can be set as album themes. The types of themes are predetermined in this embodiment. A communication I/F 106 is an interface used by the server 200 to communicate with the device 400.

Although the hardware arrangement of the device 400 will not be particularly described, it may include a hardware arrangement similar to that of the cloud server 200 without the GPU 102. The device 400 may also include a display for displaying the processing result of an application and an input device such as a keyboard, a mouse, a touch panel, or the like.

<Software Arrangement>

Figure 3:
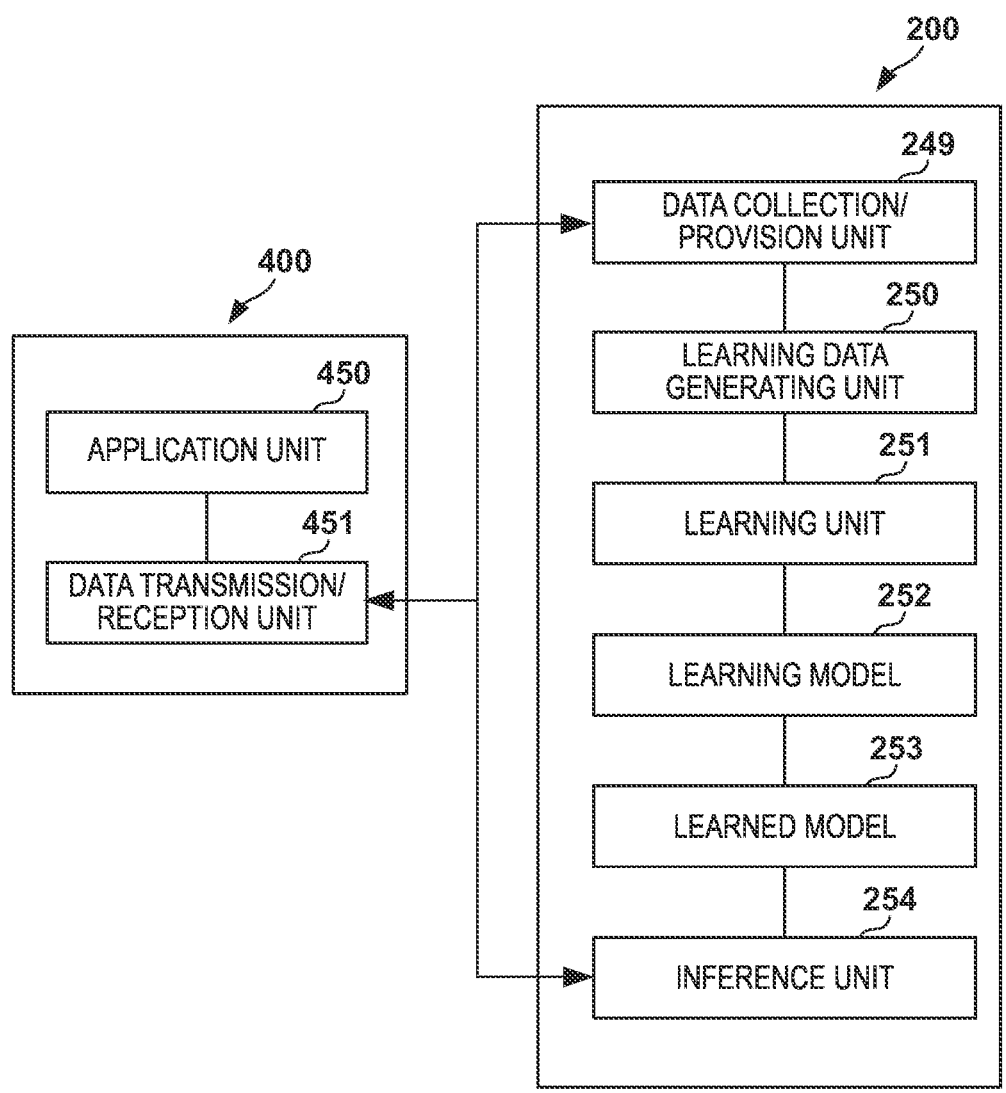
FIG. 3 is a block diagram showing the software arrangement of an album creation system.

FIG. 3 is a block diagram showing the software arrangement of the generating system 100. FIG. 3 shows only the modules of the software arrangement which are related to the learning and inference processing operations according to this embodiment, and other software modules have been omitted.

The cloud server 200 includes a data collection/provision unit 249, a learning data generating unit 250, a learning unit 251, a learning model 252, a learned model 253, and an inference unit 254.

The data collection/provision unit 249 is a program module that provides, as the data constellation to be used for machine learning, the data received from the device 400 to the learning data generating unit 250. The learning data generating unit 250 is a program module that generates, from the received data, the learning data that can be processed by the learning unit 251. The learning data is a data set of input data X of the learning unit 251 and supervised data T which indicates the correct answer of the learning result.

The learning unit 251 is a program module that executes learning by the learning model 252 by using the learning data received from the learning data generating unit 250. The learning model 252 accumulates the results of the learning performed by the learning unit 251. As one example, an example in which the learning model 252 is implemented as a neural network will be described.

Classification of input data and determination of evaluation values can be performed by optimizing the weighting parameters between the nodes of a neural network. The accumulated learning model 252 is used as the learned model 253 for inference processing. Assume that the learned model 253 is also implemented as a neural network in a manner similar to the learned model 252. However, the learned model 253 may be the same learning model as the learning model 252 or may be a model that extracts and uses a part of the learning model 252. The learned model 253 is generated for each user who uses the service, and is stored as the above-described learned model F1 in the HDD 105. Also, the theme included in the learning data is stored as the theme information F2 in association with the learned model F1 (in other words, the user) in the HDD 105.

The inference unit 254 is a program module that uses the learned model 253 to execute inference based on the data transmitted from the device 400 and returns the inference result to the device 400. The data transmitted from the device 400 is data to be the input data X of the inference unit 254. The learned model 253 is used for inference performed in the cloud server 200.

The device 400 includes an application unit 450 and a data transmission/reception unit 451. The application unit 450 is a program module for receiving the provision of an electronic album automatic generation service, and is a program module that provides a UI (User Interface) between the user and the cloud server 200. The data transmission/reception unit 451 is a module that requests the cloud server 200 to perform learning or inference.

<Learning Model>

Figure 4A:
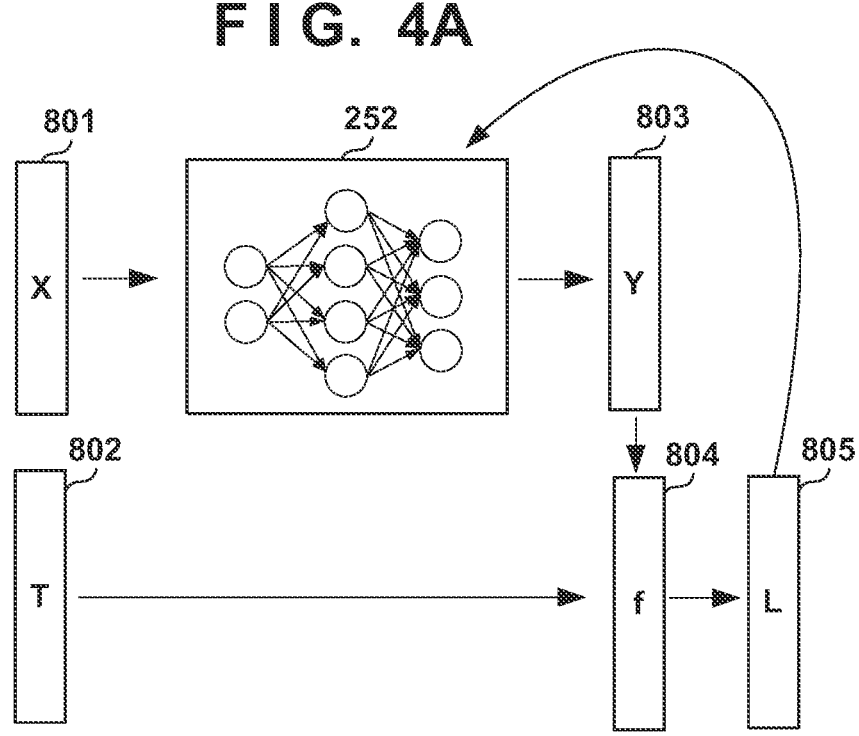
FIG. 4A is a conceptual view showing an input/output structure of a learning model.
Figure 4B:
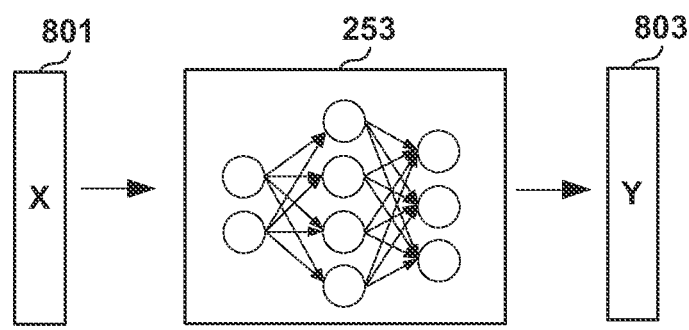
FIG. 4B is a conceptual view showing another input/output structure of the learned model.

FIGS. 4A and 4B are conceptual views showing the input/output structure of the learning model 252 and the learned model 253. FIG. 4A shows the relationship between the learning model 252 and the input/output data during learning. The learning model 252 is, for example, a default model.

Input data X 801 is data of the input layer of the learning model 252. Output data Y 803 is output as a result of recognizing the input data X by using the learning model 252 as a machine learning model. Since supervised data T 802 is provided as the correct answer data of the recognition result of the input data X during learning, a shift amount L 805 is obtained from the correct answer of the recognition result by providing the output data Y and the supervised data T to a loss function 804. A connection weight coefficient or the like between the nodes of each neural network in the learning model 252 is updated so that the shift amount L will be minimized with respect to each of the multiple learning data sets. Back propagation is a method in which the connection weight coefficient or the like between the nodes of each neural network is adjusted so that the above-described error will be minimized.

More specific examples of algorithms for machine learning are the nearest neighbor algorithm, the Naive Bayes algorithm, a decision tree, a support vector machine, and the like. Deep learning in which the feature amount and the connection weight coefficient for learning are self-generated by using a neural network can be raised as another example of a machine learning algorithm. An algorithm that can be used among the above-described algorithms can be appropriately applied to this embodiment.

FIG. 4B shows the relationship between the learned model 253 and the input/output data during inference. The input data X 801 is the data of the input layer of the learned model 253. The output data Y 803 is output as a result of recognizing the input data X by using the learning model 252 as a machine learning model. This output data Y is used as the inference result during inference. Note that although it has been described that the learned model 253 during inference includes a neural network equal to that of the learning model 252 during learning, a model obtained by extracting only a part necessary for inference may be prepared as the learned model 253. This can reduce the data amount of the learned model 253 and reduce the neural network processing time during inference.

<Learning and Inference>

To create the learned model F1 for each user, the input data X, the output data Y, and the supervised data T to be used for learning need to be collected. When the learned model F1 is to be created for the first time, the data may be collected by conducting a trial electronic album order with respect to the user and providing the electronic album based on the order. The data may also be collected based on an actual order instead of a trial order. Even after the learned model F1 has been created, the learned model F1 can be updated by collecting the data of the actual orders and further performing machine learning based on the collected data.

In this embodiment, the learning unit 251 performs learning based on the album order information of the user. The album theme and the information related to the candidates of images to be put in the electronic album are input as the input data X 801 in the learning unit 251 of the cloud server 200. The information related to the candidates of images to be put in the electronic album may be image data or information (the number of images, the feature amount, and the like) extracted from the image data. The learning model 252 which is set as a default model is used when learning is to be performed initially without a learned model that corresponds to the user. The learning unit 251 outputs an automatically generated electronic album as the output data Y 803.

The electronic album to be finally provided to the user after undergoing editing by the user is used as the supervised data T 802. In the example of the processing of FIG. 5 (to be described later), the electronic album transmitted from the cloud server 200 to the device 400 is used as the supervised data T 802 in step S18. The learning model 252 performs learning so as to minimize the shift amount L 805 by arithmetically processing the shift amount L 805 between the output data Y 803 and the supervised data T 802 by the loss function f 804. The images and the layout to be used are learned by associating the user and the album theme in the learning unit 251. As a result, the learned model 253 (F1) for automatically generating an electronic album that matches the preference of the user in accordance with the album theme can be constructed for each user. Also, the theme information F2 indicating the album theme used for learning is created for each user as the input data X 801.

During inference (at the time of an actual order), the album theme and the information related to the candidates of images to be put in an electronic album are input as the input data X 801 to the inference unit 254 of the cloud server 200 in a manner similar to the operation performed at the time of learning. An electronic album is generated as the output data Y 803 from the inference unit 254 by using the learned model 253. This electronic album will be an electronic album that reflects the preference of the user and the album theme.

PROCESSING EXAMPLE

An example of processing performed in a case in which a user (an ordering user) to whom the learned model F1 and theme information F2 have been already set orders an electronic album will be described hereinafter.

When an electronic album is automatically generated by the learned model F1 that has been constructed based on the user's past order information, an electronic album suited to the preference of the ordering user can be generated. However, if the album theme of the electronic album of the new order differs from the album theme of the electronic album which has been ordered in the past, the following problems will occur. That is, the arrangement of an electronic album tends to be easily and greatly influenced by the album theme. This is because the layout and the images suitable to be used in an electronic album will differ depending on the album theme. If an album theme that has not been learned is designated, an electronic album that greatly differs from the intention of the ordering user may be provided.

Hence, in this embodiment, the learned model F1 of the ordering user will be used in a case in which the album theme related to the new order of the ordering user is an album theme that has been learned in the learned model F1 of the ordering user. Determination as to whether the album theme has been learned will be performed by referring to the theme information F2. On the other hand, in a case in which the album theme related to the new order of the ordering user is an album theme that has not been learned in the learned model F1 of the ordering user, another learned model F1 will be used without using the learned model F1 of the ordering user.

In this embodiment, the learned model F1, which has already learned the album theme related to the new order of the ordering user, of another user is used as the other learned model F1. The learned model F1 of another arbitrary user can be used as the learned model F1 of the other user. However, for example, the target may be restricted to the learned model F1 of another user who has an attribute in common with the ordering user. It may be possible to provide an electronic album close to the preference of the ordering user even if the learned model F1 of another user is used as long as there is a common attribute. An attribute can be set based on, for example, the sex, the age group, the occupation, the hobby, or the like. The attribute of each user can be registered by the user when he/she starts to use the service and can be stored as user registration information in the HDD 105.

An electronic album ordering procedure according to this embodiment will be described with reference to FIG. 5. In FIG. 5, the processing of a user terminal indicates the processing to be executed by the device 400, and the processing of a server indicates the processing to be executed by the server 200.

The ordering user accesses the server 200 from the device 400 to start the ordering process of an electronic album (step S1). A reception process (step S11) is executed in the server 200. In these processes of steps S1 and S11, a UI related to ordering is displayed on the device 400, and the ordering user will input the order information on the UI. For example, image files to be the candidates to be put in the electronic album can be selected by the user on the UI. Also, for example, predetermined album themes are listed as selection options on the UI, and the ordering user can select one of the album themes. The order information specifying the ordering user is transmitted from the device 400 to the server 200, and the server 200 accepts this order information. The order information includes at least the information of each image to be a candidate to be put in the electronic album and the information of the album theme selected by the ordering user.

In step S12, the server 200 specifies the album theme of the electronic album related to this current order from the information of the album theme included in the order information accepted in step S11. In step S13, whether the album theme specified in step S12 has been learned by the learned model F1 of the ordering user is determined based on the theme information F2 of the ordering user and the album theme specified in step S12. If it is determined that the album theme has been learned, the process advances to step S14. If it is determined that the album theme has not been learned, the process advances to step S15.

In step S14, the server 200 selects the learned model F1 of the ordering user as the learned model F1 to be used for the current inference operation. In step S15, the learned model F1 of another user is selected.

In step S16, an electronic album is automatically generated in the server 200 based on the order information accepted in step S11 and the learned model F1 selected in step S14 or step S15. Note that the automatic generation of an electronic album may also be an operation to automatically perform at least one of selecting the images to be used in an album and laying out the selected images.

In the processes of step S2 of the device 400 and step S17 of the server 200, the ordering user performs a process on the device 400 to edit the electronic album which was automatically generated in step S16. For example, a UI for editing may be displayed on the device 400, and the ordering user can confirm the images and the layout of the images on the electronic album and perform editing tasks such as changing an image, changing the layout, correcting an image, and the like.

When the contents of the editing by the user are confirmed, the contents are used to form the final electronic album. In step S18, the server 200 transmits the final electronic album to the device 400 and the device 400 receives this final electronic album. Accordingly, the processing ends. The set made of the order information accepted in step S11 and the electronic album transmitted in step S18 can be used as the input data X and the supervised data T, respectively, to be used for updating the learned model F1 of the ordering user. As a result, even if the album theme related to the current order has not been learned by the learned model F1 of the ordering user, the learned model F1 of the ordering user can subsequently learn this album theme by machine learning.

Note that in this embodiment, as the delivery form of the electronic album, the electronic data of the electronic album is provided to the ordering user in step S18. However, an actual album obtained by printing the electronic album onto a recording medium such as paper or the like may be provided as the delivery form. In this case, order confirmation processing may be performed instead of the process of step S18 so that information indicating the order confirmation contents (the provision location, the delivery date, and the like of the actual album) will be transmitted to the device 400.

In addition, although the learned model F1 of another user is selected without the consent of the ordering user in step S15 in this embodiment, it may be arranged so that the learned model F1 of the other user will be selected after the ordering user has consented. It may be arranged so that a consent form will be displayed on the UI of the device 400 and the ordering user may select whether to give consent. If the ordering user does not give consent, the learned model F1 of the ordering user may be selected. Also, it may be arranged so that the learned model F1 of another user will not be selected in subsequent orders once the ordering user has determined not to give consent.

Furthermore, in this embodiment, a learned model of another user was selected, regardless of the type of the album theme, if the learned model F1 of the ordering user had not learned the album theme related to the current order.

However, it may be arranged so that this kind of processing will be performed for only specific types of album themes (for example themes which tend to have a great influence on the arrangement of the album). It may be arranged so that the learned model F1 of the ordering user will be selected for other types of album themes (for example, themes which are not limited to a specific matter such as themes which can be categorized as "Other").

Second Embodiment

The first embodiment assumed that, with respect to the specification of an album theme in step S12, an album theme designated by an ordering user will be included in the order information. However, the album theme may be estimated from the information of the candidates of images to be put in the electronic album included in the order information. FIG. 6 shows an example of the processing according to this embodiment, and shows an example of processing which can be performed instead of the processing of FIG. 5. Only a process which is different from that of the example of the processing of FIG. 5 will be described hereinafter.

In this embodiment, the process of step S12' is executed instead the process of step S12 in FIG. 5. An image analysis result of the candidate images to be put in the electronic album is obtained in this step. A conventional technique can be adopted as the image analysis method to specify, for example, an attribute of an object included in each image, and an album theme is estimated based on this specified attribute.

Third Embodiment

The first and second embodiments assumed that a single album theme will be specified for a single electronic album. However, if the electronic album has a plurality of pages, an album theme may be specified on a page basis. In this case, a learned model is selected on a page basis for the electronic album, and the page arrangement will be automatically generated.

Fourth Embodiment

A plurality of types of learned models F1 stored in an HDD 105 may include the learned model F1 which is not associated with a user, and this learned model F1 may be selected in step S15 of FIG. 5. The learned model F1 which is not associated with a user is, for example, a learned model obtained by executing machine learning which uses the pieces of order information of all of the users and the electronic album provided to the user (in step S18) as input data X and supervised data T, respectively. This learned model is a model which has basically learned all of the album themes, and is a highly versatile model which reflects the preferences of everyone. By selecting such a learned model with high versatility in the process of step S15 in FIG. 5, it is possible to prevent an electronic album that greatly differs from the intention of the user from being provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-224829, filed Dec. 12, 2019, which is hereby incorporated by reference herein in its entirety.

What is claimed is:

1. An electronic album generating apparatus comprising:
one or more processors; and
one or more memories storing instructions, which when executed by the one or more processors, cause the electronic album generating apparatus to perform the functions of:
    an accepting unit configured to accept order information of an electronic album from a user;
    a specifying unit configured to specify, based on the order information, a theme of the electronic album;
    a selecting unit configured to select, from a plurality of learned models generated by machine learning based on a past order of the user from whom the order information was accepted, a learned model to be used to generate the electronic album; and
    a generating unit configured to generate an electronic album based on the order information and the learned model selected by the selecting unit,
    wherein in a case in which the learned model generated by the machine learning based on the past order of the user has not learned the theme specified by the specifying unit, the selecting unit selects another learned model which has learned the theme.

2. The apparatus according to claim 1, wherein in a case in which the learned model generated by the machine learning based on the past order of the user has learned the theme specified by the specifying unit, the selecting unit selects the learned model.

3. The apparatus according to claim 1, wherein the order information includes information of the theme designated by the user, and
    the specifying unit specifies the theme of the electronic album from the information of the theme.

4. The apparatus according to claim 1, wherein the order information includes information of a candidate of an image to be put in the electronic album, and
    the specifying unit specifies the theme of the electronic album by estimating the theme based on an image related to the information of the candidate.

5. The apparatus according to claim 1, wherein in a case in which the learned model generated by the machine learning based on the past order of the user has not learned the theme specified by the specifying unit, the selecting unit selects a learned model of another user which has learned the theme.

6. The apparatus according to claim 1, wherein in a case in which the learned model generated by the machine learning based on the past order of the user has not learned the theme specified by the specifying unit, the selecting unit selects another learned model which has learned the theme and is not associated with a user.

7. An electronic album generating method comprising:
    accepting order information of an electronic album from a user;
    specifying, based on the order information, a theme of the electronic album;
    selecting, from a plurality of learned models generated by machine learning based on a past order of the user from whom the order information was accepted, a learned model to be used to generate the electronic album; and
    generating an electronic album based on the order information and the learned model selected in the selecting,
    wherein in a case in which the learned model generated by the machine learning based on the past order of the user has not learned the theme specified in the specifying, another learned model which has learned the theme is selected in the selecting.

8. A non-transitory computer-readable storage medium storing a program to cause a computer to perform the functions of:
    accepting order information of an electronic album from a user;
    specifying, based on the order information, a theme of the electronic album;
    selecting, from a plurality of learned models generated by machine learning based on a past order of the user from whom the order information was accepted, a learned model to be used to generate the electronic album; and
    generating an electronic album based on the order information and the learned model selected by the selecting,
    wherein in a case in which the learned model generated by the machine learning based on the past order of the user has not learned the theme specified by the specifying, the selecting selects another learned model which has learned the theme.

* * * * *